United States Patent [19]

Moriya et al.

[11] Patent Number: 5,508,995
[45] Date of Patent: Apr. 16, 1996

[54] OPTICAL DISK CAPABLE OF RECORDING INFORMATION ON BOTH GROOVE AND LAND TRACKS

[75] Inventors: Mitsurou Moriya, Ikoma; Yasuhiro Sugihara, Katano; Shunji Oohara, Higashiosaka; Yasuki Matsumoto, Takarazuka; Shin-ichi Yamada, Katano, all of Japan

[73] Assignee: Matsushita Electric Industrial Co., Ltd., Osaka, Japan

[21] Appl. No.: 275,984

[22] Filed: Jul. 15, 1994

[30] Foreign Application Priority Data

Jul. 15, 1993 [JP] Japan .................................. 5-175241
Aug. 5, 1993 [JP] Japan .................................. 5-194614

[51] Int. Cl.⁶ ........................................................... G11B 7/24
[52] U.S. Cl. ........................................ 369/275.4; 369/275.3
[58] Field of Search ............................... 369/275.4, 275.3, 369/275.1, 277, 278, 279, 275.2

[56] References Cited

U.S. PATENT DOCUMENTS

| | | | |
|---|---|---|---|
| 4,748,609 | 5/1988 | Yonezawa et al. | 369/275.3 |
| 4,949,332 | 8/1990 | Veenis et al. | 369/275.3 |
| 4,964,094 | 10/1990 | Satoh et al. | 369/59 |
| 5,038,339 | 8/1991 | Pasman et al. | 369/275.4 |
| 5,210,738 | 5/1993 | Iwata et al. | 369/275.3 |
| 5,270,998 | 12/1993 | Uchiumi | 369/275.4 |
| 5,383,176 | 1/1995 | Inui et al. | 369/275.4 |

FOREIGN PATENT DOCUMENTS

| | | |
|---|---|---|
| 57-50330 | 3/1982 | Japan . |
| 60-121550 | 6/1985 | Japan . |
| 62-184630 | 8/1987 | Japan . |
| 5-144183 | 6/1993 | Japan . |

Primary Examiner—Georgia Y. Epps
Assistant Examiner—Tan Dinh
Attorney, Agent, or Firm—Ratner & Prestia

[57] ABSTRACT

An optical recording medium includes a groove track and a land track provided on a resin substrate. Each of the tracks is divided into a plurality of sectors for every turn. Each sector has an ID region, a servo region, and an information region. A pit in the ID region is formed so as to span across both the groove track and the land track. The first wobble pit and the second wobble pit are provided on both sides of the center line of each track, and they are spaced with each other in the direction of the track. Thus, since a larger width of the pit can be provided, production of the optical recording medium can be facilitated. Moreover, since the center of the track can be detected accurately by the first and second wobble pits, accurate tracking control can be performed.

17 Claims, 9 Drawing Sheets

OPTICAL DISK CAPABLE OF RECORDING INFORMATION ON BOTH GROOVE AND LAND TRACKS

BACKGROUND OF THE INVENTION

1. Field of the Invention

The present invention relates to an optical recording medium for recording information using heat caused by a converged light beam, and particularly relates to an optical recording medium having land and groove tracks.

2. Description of the Related Art

In recent years, optical recording medium dedicated to recording information have played an important role for storing voice information data, video information data, and the like, because of their large capacity. An optical recording medium having a larger capacity has been in demanded. In order to satisfy this demand, the recording density of a recording medium needs to be increased. Information density of an optical recording medium is determined by the pitch of the information tracks and the information density in the direction of the tracks, namely the linear density of information. In order to improve the information density on the optical recording medium, the pitch of the track needs to be narrower, or the linear density needs to be larger.

A typical example of a conventional optical recording medium has a small spiral grooved track of 0.8 μm width and 1.6 μm pitch formed on a resin disk substrate. Then, a thin film of a phase change type material consisting of three elements, such as Te, Sb, and Ge as its main constituents is formed on the surface of the substrate by a sputtering method or the like, and a protection layer is formed on the thin film (as described An Japanese Laid-Open Patent Publication No. 60-121550). A stamper is made based on a master disk on which the groove track is cut, and numerous resin substrates replicated from the master disk are produced by injection or the like.

Since this conventional optical recording medium is constructed to record information on the groove track, the track width becomes narrower as the track pitch is made narrower, and production of the master disk or replication of the resin substrate thus becomes difficult. Moreover, when the information recorded on the track is reproduced, since the power of reflected light or transmitted light from the track decreases, the quality of the reproduced signal becomes degraded.

One of the purposes for providing the groove track is to control the light beam so that it is exactly positioned on the track by detecting a deviation signal indicating a deviation of the light beam, which is radiated on the optical recording medium, with regard to the track. Generally, the deviation signal of the light beam on the optical recording medium with regard to the track, namely a tracking error signal, is detected by a push-pull method. In the push-pull method, a far field pattern of the reflected or transmitted light from an optical recording medium is detected by a divided photodetector having two photosensitive regions, and a deviation of the light beam with regard to the track on the optical recording medium is detected according to a difference between the photoelectric currents detected at both of the photosensitive regions. The width and pitch of the track determine the intensity and dynamic range of the tracking error signal. AS the track width is made narrower so as to reduce the intensity of the pitch, the amplitude of the tracking error signal becomes smaller and the dynamic range becomes narrower, the quality of the tracking error signal thus becomes degraded. As a result, the tracking control becomes unstable, and a jumping of tracks tends to occur when an external shock, such as shaking or hitting, is applied.

In order to solve these problems, it is proposed that a spiral groove track is formed in the radial direction of an optical recording medium so as to attain a high information density by recording information also on the land track between adjacent turns of the groove track (as shown in Japanese Laid-Open Patent Publication No. 57-50330). In this optical recording medium, when the pitch of the groove or land track is 1.6 μm, the distance between the groove and land tracks, namely the track pitch, is half the pitch of the groove or land track, or 0.8 μm. However, the amplitude of the tracking error signal does not become smaller and the dynamic range does not become narrower.

An identification information for identifying positions is necessary to record information on a desired position or to search for the desired information. In order to provide the identification information for identifying positions of recording regions on both the groove and land tracks, since the pitch of the pits for the identification information in the radial direction is 0.8 μm, the pit width for the identification information needs to be a half of or less than the width of the groove and land tracks. This makes it difficult to produce a master disk and to replicate resin, substrates. Furthermore, three cutting light beams: a light beam for cutting the groove track; a light beam for cutting the identification information on the land track and a light beam for cutting the identification information on the groove track are required to produce the master disk, so a cutting machine consequently becomes complex and expensive.

Moreover, since this optical recording medium has two spiral tracks (i.e., the groove and land tracks), it takes time for a reading head to move from the groove track to the land track, and vice versa. Thus, there is a problem that information can not be recorded continuously.

SUMMARY OF THE INVENTION

The optical recording medium in a disk shape of this invention includes: a substrate having a groove track and a land track, information being recorded on both the groove track and the land track; a recording thin film formed on the substrate; and identification information pits for identifying a recording region of each of the groove track and the land track, the identification information pits being commonly used for the groove track and the land track adjacent to each other.

Alternatively, the optical recording medium in a disk shape includes: a substrate having groove and land tracks, information being recording on both the groove and land tracks, and a width of the land track being smaller than a width of the groove track; and a recording thin film provided on the substrate, information being recorded by heat produced by a light beam on the recording thin film.

Alternatively, the optical recording medium in a disk shape includes: a substrate having groove and land tracks, information being recording on both of the groove and land tracks, and a widths of the groove track and the land track of outer turns being smaller than widths of the groove track and the land track of inner turn, respectively; and a recording thin film provided on the substrate, information being recorded by heat produced by a light beam on the recording thin film.

Alternatively, the optical recording medium includes: a substrate in a disk shape which has a single spiral track formed by alternately providing a groove track and a land track; a recording thin film for recording information formed on the substrate; and an identification region in which an identification information for identifying whether the groove track or the land track is stored, the identification region being provided on a top of each of the groove track and land track.

Alternatively the optical recording medium includes: a substrate in a disk shape which has a single spiral track formed by alternately providing a groove track and a land track; a recording thin film for recording information formed on the substrate; and a track address for identifying a recording region in which information is recorded, the track address being provided on the top of each of the groove track and the land track.

Alternatively, the optical recording medium includes: a substrate An a disk shape which has a single spiral track divided into an odd number of more than three sectors in a turn, and which has a groove track and a land track provided alternately; and a recording thin film for recording information formed on the substrate.

Thus, the invention described herein makes possible the advantages of (1) providing an optical recording medium suitable for high density recording which enables accurate tracking control when tracks are formed with a narrow pitch thereon, and which can be produced easily, and (2) providing an optical recording medium suitable for high density recording which enables continuous recording and reproducing.

These and other advantages of the present invention will become apparent to those skilled in the art upon reading and understanding the following detailed description with reference to the accompanying figures.

DESCRIPTION OF THE PREFERRED EMBODIMENTS

An example of an optical recording medium of the invention will be described with reference to the accompanying drawings.

EXAMPLE 1

Figure 1A:
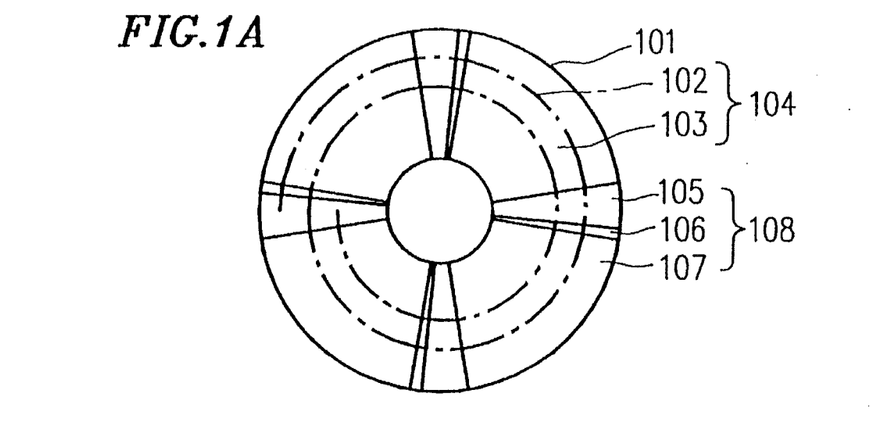
FIG. 1A is a schematic surface view of an optical recording medium of Example 1 of the invention.
Figure 1B:
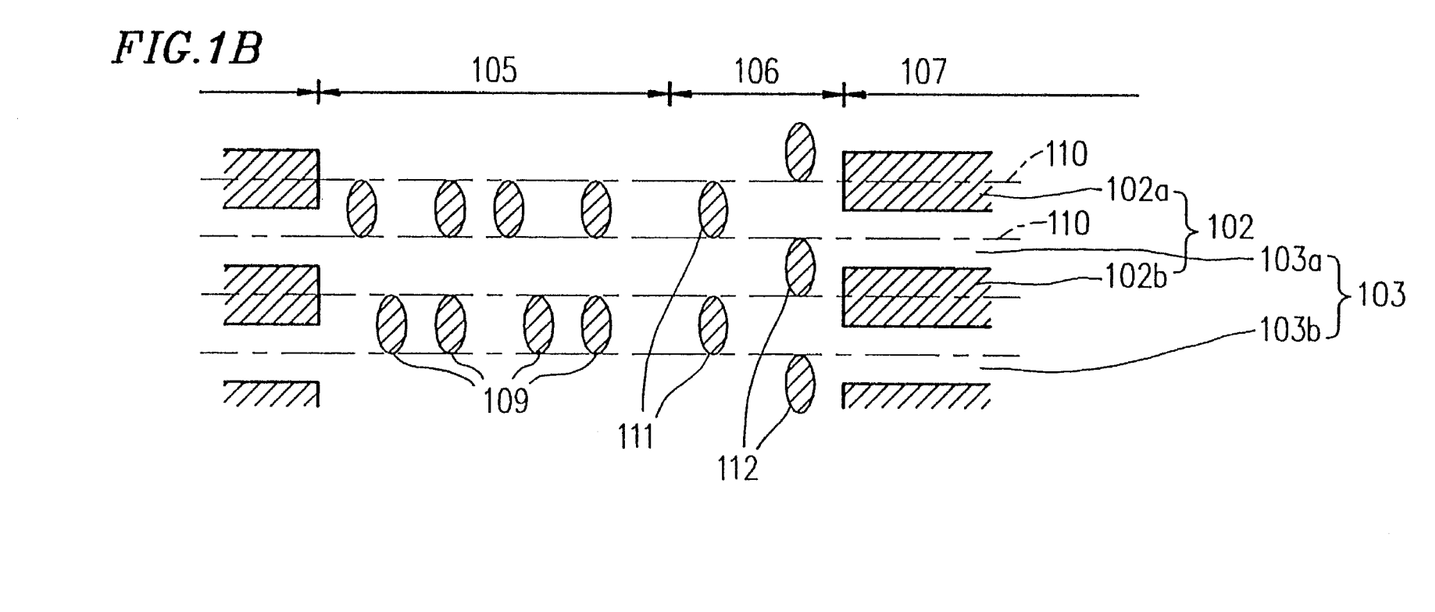
FIG. 1B is a partially enlarged view of the surface of the optical recording medium shown in FIG. 1A.

FIGS. 1A and 1B show schematic views of an optical recording medium of Example 1 of the invention. FIG. 1A is a plan view of an optical recording medium 101. The optical recording medium 101 has two spiral tracks 104: a groove track 102, and a land track 103. Information is recorded on both of the groove and land tracks 102 and 103. A turn of the track 104 is divided into four sectors 108. Each sector 108 includes an identification (ID) region 105, a servo region 106, and an information region 107.

FIG. 1B is an enlarged partial view showing part of the ID region 105 and the servo region 106. An identification information for identifying the position of a sector, e.g., an address information, Is stored in the ID region 105. Pits 109 for the identification Information are provided approximately on the extent of the border line between the groove track 102 and the land track 103. The information region 107 of the adjacent groove track 102 and the land track 103 is identified based on the same identification information. Specifically, a groove track 102a end a land track 103a, and a groove track 102b and a land track 103b are identified based on the respective same identification informations.

When tracking control is performed by detecting a tracking error signal using the push-pull method, tracking error signals of the groove track 102 and the land track 103 have opposite polarities. Thus, even if the same its for information identification are used to identify the position of the information region 107 in both of the groove and land tracks 102 and 103, there is no problem because the groove and land tracks 102 end 103 can be identified from the polarity of the tracking control.

Dashed lines 101 indicate the center of each of the groove and land tracks 102 and 103. First and second wobble pits 111 and 112 are provided on both sides of the track center 110 in the servo region 106. The shapes of the first and second wobble pits 111 and 112 are symmetric with respect to the track center 110, and the first and second wobble pits 111 and 112 are spaced in the direction of the tracks. The wobble pits 111 and 112 are for correcting a false signal in the tracking error signal detected by the push-pull method. A wobble tracking error signal detected by the first and second wobble pits 111 and 112 corresponds to the difference between the peak levels of the amplitude of the reproduced signals of the first and second wobble pits 111 and 112. Therefore, A gate signal for detecting the peak of the reproduced signals of the first and second wobble pits 111 and 112 is required. In the optical recording medium 101 shown in FIG. 1B, the first and second wobble pits 111 and 112 are provided after the ID region 10B so that the gate signal can be produced easily from the pits 109 representing the identification information. Specifically, the signal of the first and second wobble pits 111 and 112 is reproduced after reading the identification information.

The optical recording medium 101 of the invention shown in FIGS. 1A and 1B has two spiral tracks 104. When the two spiral tracks are cut, by continuously cutting a spiral groove track 102 for instance, the continuous land track 103 can be obtained, that is, the portion between adjacent turns of the groove track 102 is a continuous land track 103. According to the conventional art, if separate identification informations are provided for each groove track and land track, in addition to light beams for cutting groove track and identification information pits for groove track, a light beam for cutting the identification information pits for the land track is necessary. However, according to this invention, if the ID region 105 is provided approximately on the center of each groove and land tracks 102 and 103, only the light beams for cutting groove track 102 and pits 109 for the identification information are needed.

Moreover, as shown in FIG. 1B, if the width of the groove track 102 or the land track 103, and all of the widths of the pits 109 in the ID region 105 and the first and second wobble pits 111 and 112 are nearly equal to each other, each pit can be cut by the same light beam used for cutting the tracks 104. However, the light beam should be slightly moved to the radial direction of the optical recording medium 101 by a deflector or the like when the pits 109 and the first and second wobble pits 111 and 112 are cut.

According to the optical recording medium 101 of the invention, since cutting is performed only by a single light beam, construction of a cutting machine can be simplified. In addition, since large pits can be used, the medium can be replicated easily by injection or the like.

Figure 2:
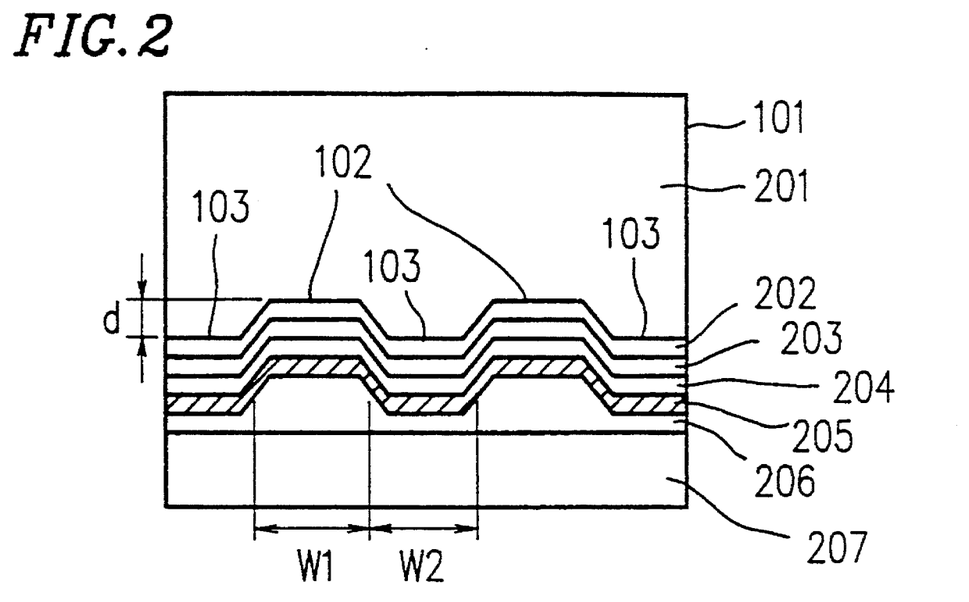
FIG. 2 is an enlarged cross section of the optical recording medium of Example 1 of the invention.

An emphasized and enlarged cross section of the optical recording medium 101 taken along the radial direction is shown in FIG. 2. The groove and land tracks 102 and 103 are formed on the surface of a resin substrate 201 made of polycarbonate or the like. A dielectric film 202 made of $SiO_2$ or the like, a recording material film 203, a dielectric film 204, and a reflection layer 205 made of aluminum or the like are formed successively on the substrate 201. The reflection layer 205 is bonded to a protection layer 207 with an adhesive layer 206. The reflection layer 205 is provided for increasing the signal reading sensitivity, and for improving the thermal release so as to protect the recording material layer 203 from heat. The recording material layer 203 is made of a phase change type material containing Te (tellurium), Sb (antimony), and Ge (germanium) for its main constituents which is formed by sputtering or the like. The dielectric films 202 and 204 are for protecting the recording material film 203 from humidity or heat, and they can be omitted.

The phase change type recording material has a characteristic that it crystallizes when it is slowly cooled after having been heated, and it becomes amorphous when rapidly cooled after having been melted. Information can be stored in the same position repeatedly like a magnetic recording medium, such as a floppy or hard disk, by reversibly changing crystal and amorphous states of the phase change type recording material by utilizing this characteristic.

When information is recorded on the phase change type recording material, the intensity of the light beam is modulated strongly or weakly between the crystal and amorphous levels according to the signals to be recorded while the recording material is rotated at a predetermined velocity and tracking is controlled so that the light beam is positioned on a track. For instance, when recording is performed so that a recording mark is in an amorphous state, a mark in the amorphous state is formed by radiating a light beam having the power approximately strong enough for melting the recording material thin film. During the period other than that corresponding To the recording mark, a light beam having power lower than the energy required to melt the thin film is radiated for crystallization. Thus, during the period other than that corresponding to the recording mark, the radiated region of the thin film becomes the crystal state whether its previous state was amorphous or crystal, and information can be overwritten even on a region in which different information is already stored. By using the fact that a reflectance and a transmittance are different in the amorphous and crystal states, the information recorded on the phase change type recording material is reproduced. For instance, a constant wear light beam is radiated onto the recording medium and the reflected light beam from the recording medium is received by a photodetector, and then, by detecting changes in the power of the reflected light beam, the information is reproduced.

Figure 3:
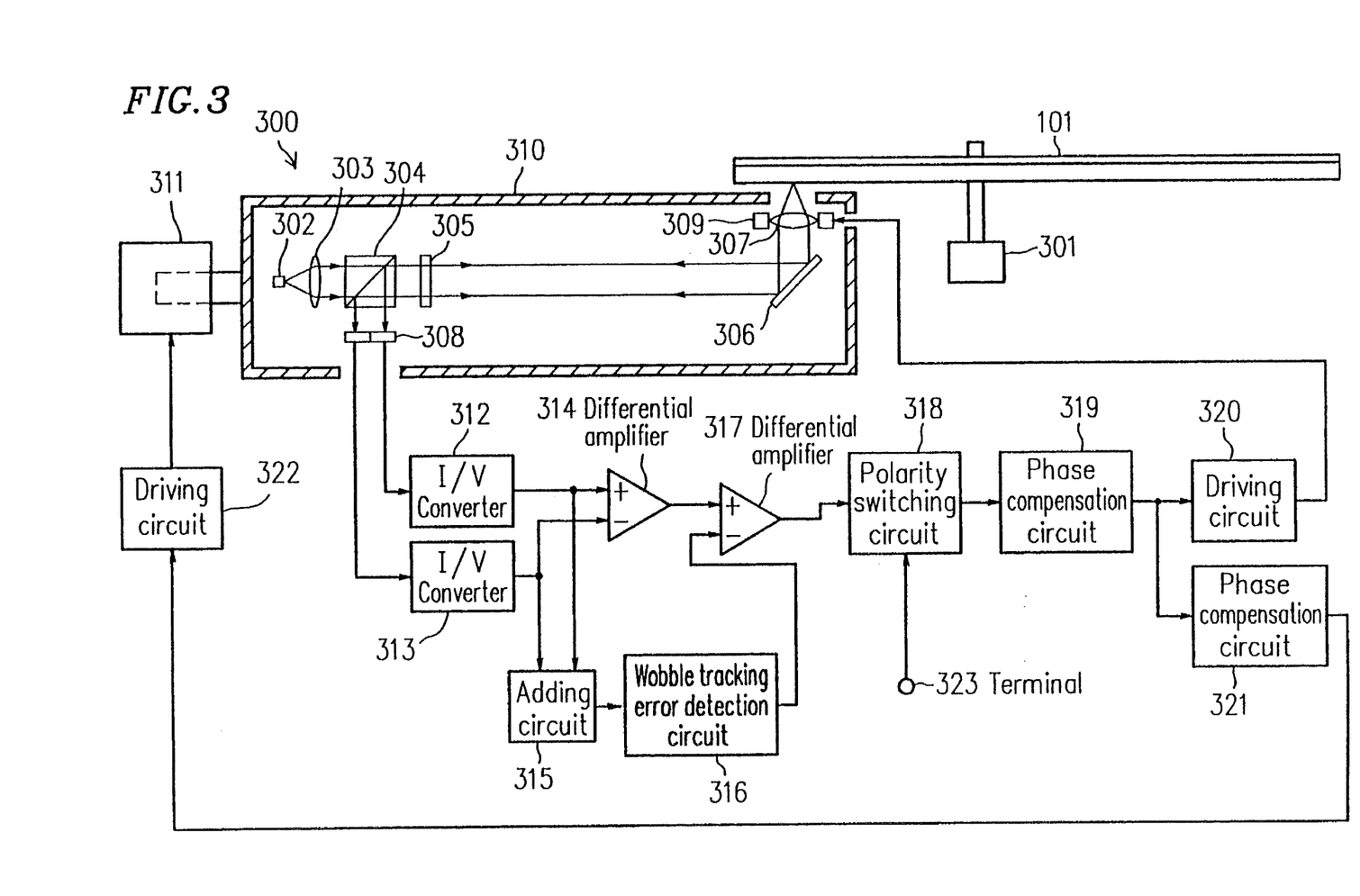
FIG. 3 is a block diagram of en apparatus suitable for recording or reproducing information on the optical recording medium of Example 1 of the invention.

An apparatus 300 for recording and reproducing information (hereinafter, referred to as a recording and reproducing apparatus) loaded with the optical recording medium 101 described above will be briefly described with reference to FIG. 3.

The recording and reproducing apparatus 300 includes a motor 301. The optical recording medium 101 is placed on the rotation axis of the motor 301 and rotated at a predetermined velocity of rotation. The recording and reproducing apparatus 300 includes devices for radiating a light beam to the optical recording medium 101, and devices for receiving the reflected light beam from the optical recording medium 101. Specifically, the recording and reproducing apparatus 300 includes a light source 302, a coupling lens 303, a polarizing beam splitter 304, a quarter wave length plate 305, a total reflection mirror 306, an objective lens 307, a photodetector 308, and an actuator 309. The light source 302, the coupling lens 303, the polarizing beam splitter 304, the quarter wave length plate 305, the total reflection mirror 306, the photodetector 308, a the fixed portion of the actuator 309 are placed on a transport stage 310. The transport stage 310 is constructed so as to move together with the devices described above in the radial direction of the optical recording medium 101.

A light beam emitted by the light source 302, such as a semiconductor laser, is collimated by the coupling lens 303, passes through the polarizing beam splitter 304 and the quarter wave length plate 305. Then the light beam is reflected by the total reflection mirror 306, and converged and radiated onto the optical recording medium 101 by the objective lens 307. The focus of the objective lens 307 is controlled so that the light beam radiating on the optical recording medium 101 is always in a predetermined converging state.

The actuator 309 has a movable portion in addition to the fixed portion. The movable portion includes a coil for tracking (tracking coil) and another coil for focusing (focusing coil). The fixed potion includes a permanent magnet. The objective lens 307 is placed on the movable portion of the actuator 309. When an electric current flows through the tracking coil of the movable portion, the objective lens 307 moves in the radial direction of the information recording medium 101. In other words, it moves so as to traverse the track on the optical recording medium 101, due to the electromagnetic force that the tracking coil receives. When an electric current flows through the focusing coil, the objective lens 307 moves in the direction vertical to the surface of the optical recording medium 101 due to the electromagnetic force that the focusing coil receives.

The reflected light beam from the optical recording medium 101 passes through the objective lens 307, and is reflected by the total reflection mirror 306. Then, the light passes through the quarter wave length plate 305, and is reflected by the polarizing beam splitter 304 to be radiated on the photodetector 308. The photodetector 308 has a half-split structure.

The recording and reproducing apparatus 300 includes I/V converters 312 and 313, a differential amplifier 314, an adding circuit 315, a wobble tracking error detection circuit 316, a differential amplifier 317, a polarity switching circuit 318, phase compensation circuits 319 and 321, end driving circuits 320 and 322.

Two output signals from the photodetector 308 are input to the I/V converters 312 and 313 for converting a current into a voltage, respectively. The outputs of the I/V converters 312 and 313 are input to the differential amplifier 314, and the differential amplifier 314 outputs a signal in accordance with the difference of the two signals. An output signal of the differential amplifier 314 is a signal which indicates a positional deviation of the light converged on the optical recording medium 101 with regard to tracks 104, namely a tracking error signal. The method for detecting the tracking error signal is based on the push-pull method.

The adding circuit 315 adds signals from the I/V converters 312 and 313 to output the resulting signal. The adding circuit 315 outputs signals corresponding to the pits 109 in the ID region 105 shown in FIG. 1 the first wobble pit 111 and the second wobble pit 112; end the difference between the reflectances for the amorphous state and the crystal state indicating informsrich which is stored in the information region 107. The reading out of the identification information stored in the ID region 105 and of the information stored in the information region 107 are performed according to their respective output signals. An added signal from the adding circuit 315 is input to the wobble tracking error detection circuit 316 for detecting a positional deviation from the wobble pits 111 and 112. The wobble tracking error detection circuit 316 detects peak amplitudes of the first and second wobble pits 111 and 112 provided in the servo region 106 shown in FIG. 1 according to the identification information, and sends a signal corresponding to the difference between both peak levels to the differential amplifier 317.

The differential amplifier 317 calculates the difference between an output signal from the differential amplifier 314 and a signal from the wobble tracking error detection circuit 315. The output signal from the differential amplifier 317 is applied to the tracking coil of the actuator 309 through the polarity switching circuit 318 for inverting the polarity of the tracking control, the phase compensation circuits 319 for compensating a phase of the tracking control system, and the driving circuit 320 for amplifying electric power. The tracking control is accordingly performed for the light beam converged on the optical recording medium 101 so that the light is always positioned on the track 104. The signal from the differential amplifier 317 is applied to the linear motor 311 through the polarity switching circuit 318, the phase compensation circuits 319 end 321, and the driving circuit 322 for amplifying electric power. The objective lens 307 is controlled so as to move around the central position, which is the initial location of the objective lens 307 without adjusted by the actuator 309.

A selection signal for selecting whether the light beam is positioned on the groove track 102 or on the land track 103 is input to a terminal 323, and the polarity switching circuit 318 switches the polarity according to the selection signal. For instance, if the light beam is positioned on the groove track 102, the terminal 323 goes to a low level, and the polarity switching circuit 318 outputs a signal having the same phase as that of the output signal from the differential amplifier 317. Of the light beam is positioned on the land track 103, the terminal 323 goes to a high level, and the polarity switching circuit 318 outputs a signal having the inverted phase from that of the output signal from the differential amplifier 317.

Figure 4:
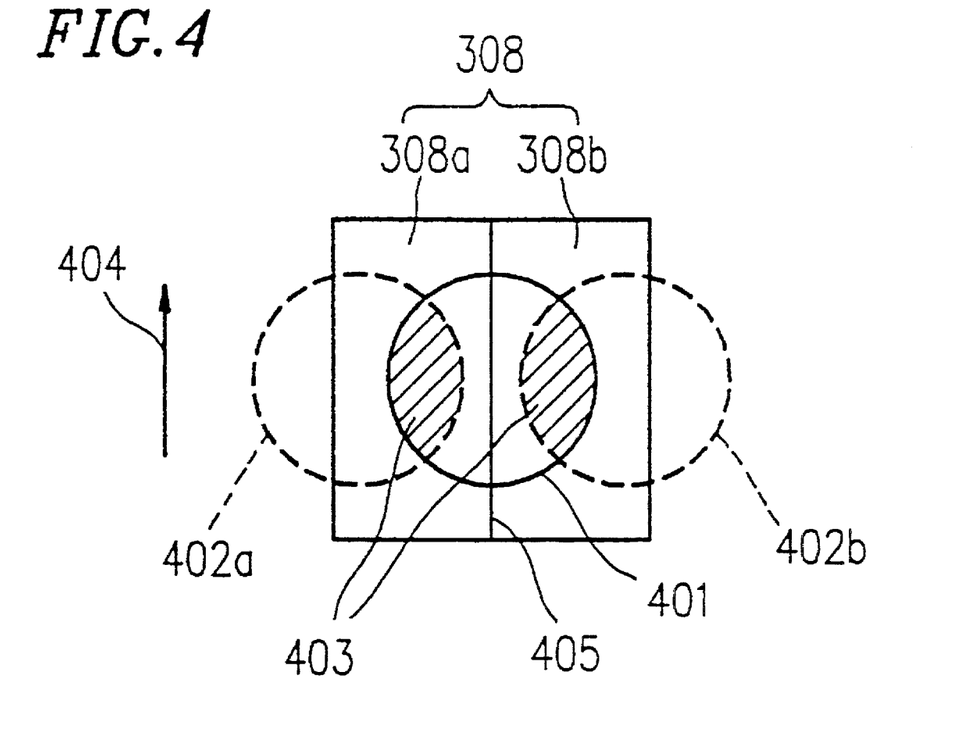
FIG. 4 is a diagram illustrating a reflection beam pattern on a photodetector used for explaining the method to detect a tracking error signal by a push-pull method.

The method for detecting a tracking error signal will be described briefly in accordance with the push-pull method with reference to FIG. 4. FIG. 4 shows the condition of the radiation of the light beam onto the photodetector 308.

The photodetector 308 is divided into photosensitive regions 308a and 308b by a dividing line 405. The dividing line 405 is set in the direction of the track on the photodetector 308, that is, the direction indicated by an arrow 404. A spot 401 illustrated with a solid line is a portion illuminated with a zero order reflected light beam. Spots 402a and 402b illustrated by broken lines are portions illuminated with +1 and −1 order reflected beams, respectively. Hatched overlapping portions 403 of the spot 401 and the spots 402a and 402b show a portion where the zero order reflected beam overlaps and interferes with ±1 order reflected beams. In the interfering portions 403, interference patterns of the right and left portions, in other words, light intensity distributions, change according to the positions of the track 104 and the light beam on the optical recording medium 101. Thus, the difference in photoelectric currents between the photosensitive regions 308a and 308b corresponds to the difference between the light intensity distributions in the right and left interfering portions 403. Therefore, a tracking error signal corresponding to a positional deviation of the light beam with regard to the track 104 on the optical recording medium 101 can be obtained.

Figure 5:
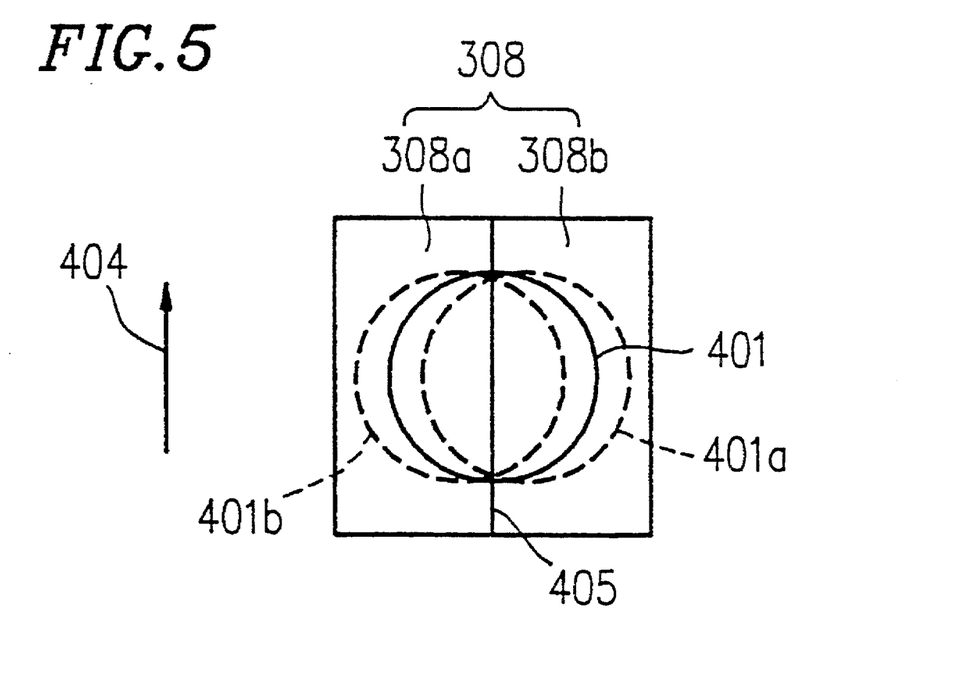
FIG. 5 is a diagram illustrating a movement of the reflected beam on the photodetector used for explaining false signals which are mixed in the tracking error signals detected by the push-pull method.

Next, with reference to FIG. 5, a false signal in the tracking error signal detected by the push-pull method will be described. As with FIG. 4, FIG. 5 shows the condition of the radiation of the light beam on the photodetector 308. For simplicity, only the zero order light spot 401 is illustrated in FIG. 5.

The track 104 on the optical recording medium 101 is generally eccentric. When the tracking is controlled so that the light beam positions on the track 104, the objective lens 307 shown in FIG. 3 moves in the direction vertical to the direction of the track 104 according to the eccentricity of the optical recording medium 101. When the objective lens 307 moves according to the eccentricity, the zero order light spot 401 on the photodetector 308 moves as shown with the spots 401a and 401b illustrated by broken lines. When the zero order light spot 401 on the photodetector 308 moves, changes corresponding to the movement of the zero order light spot 401 occur in photoelectric currents of the photosensitive regions 308a and 308b, and the changes of the current result in the false signals. Since these false signals are mixed in the original tracking error signals, the light beam is not positioned on the center of the track 104 though the tracking is controlled so that the difference between the photoelectric currents of the photosensitive regions 308a and 308b is zero. In practice, when the objective lens 307 moves, the ecliptic condition of the light beam due to the objective lens 307 or the like changes. In other words, a change occurs in the power of the reflected beam from the optical recording medium 101 which can not be received, and this change causes the false signals. Such false signals are also caused by tilting the surface of the optical recording medium 101. The false signals caused by the tilting the surface of the optical recording medium 101 are resultant from movements of the reflected beam on the photodetector 308, change in the ecliptic condition of the reflected beam, and aberration of the light beam on the optical recording medium 101.

The wobble tracking error signal detected from the wobble pits 111 and 112 in the servo region 106 are detected from the addition of photoelectric currents of the photosensitive region 308a and 308b. Therefore, the false signals do not occur when the light beam on the photodetector 308 moves. Moreover, the level of the false signals caused by the change in the ecliptic condition of the light beam and the aberrations of the light beam on the optical recording medium 101 are very low. Therefore, by calculating the difference between the tracking error signal detected by the push-pull method (i.e., the output signal of the differential amplifier 314 shown in FIG. 3) and the wobble tracking error signal (i.e., the output of the wobble tracking error detect,on circuit 316) by the differential amplifier 317, accurate tracking control can be performed since the false signals described above are canceled.

Figure 6:
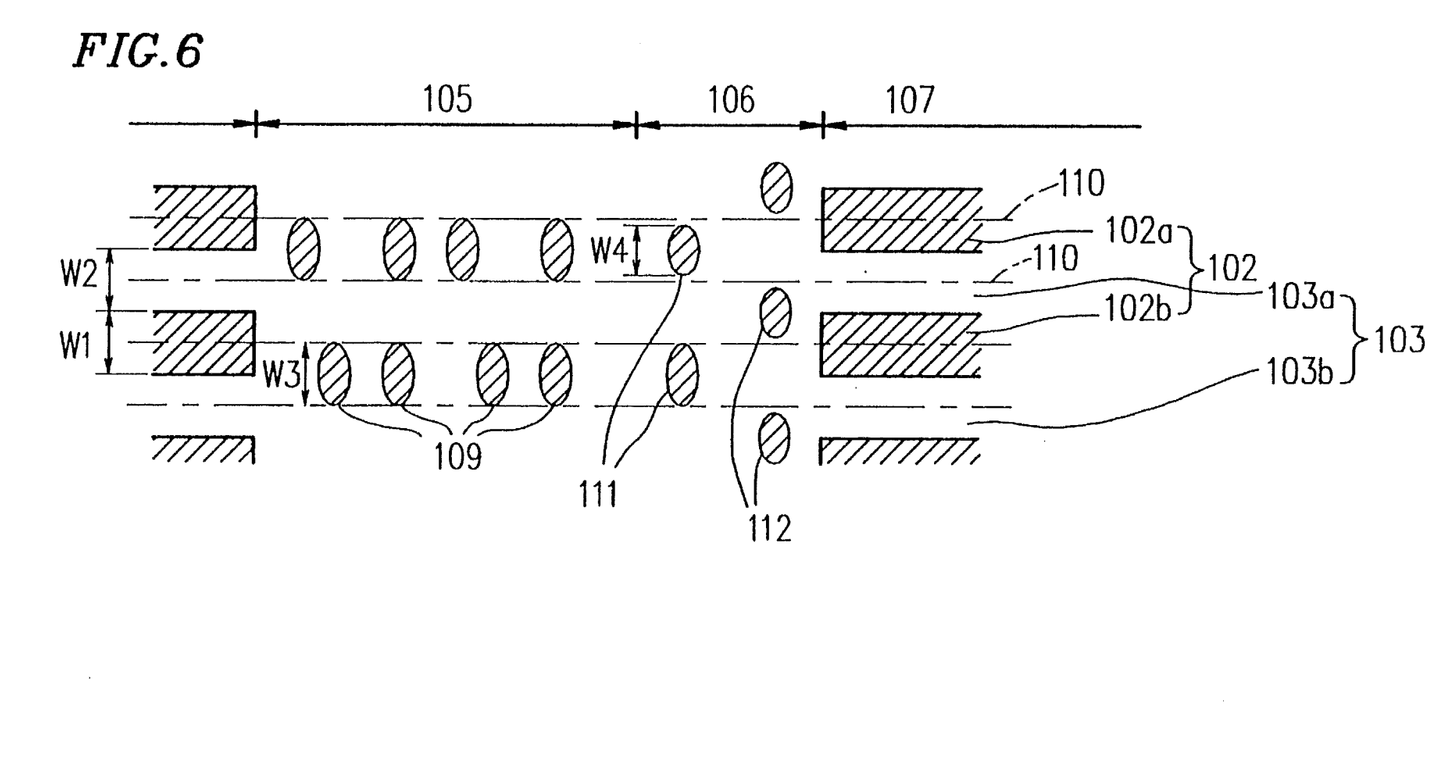
FIG. 6 is a partially enlarged view used for explaining the relationship of the widths of the track, identification information pits, and wobble pits in the optical recording medium in Example 1 of the invention.

More suitable relationships between the widths of the track 104, the pits 109 in the ID region 105, and the first and second wobble pits 111 and 112 will be described with reference to FIG. 6. FIG. 6 shows a width W1 of the groove track 102, a width W2 of the land track 103, a width W3 of the pits 109, a width W4 of the first and second wobble pits 111 and 112.

Because the pits 109 in the ID region 105 have the identification information for both the groove and land tracks 102 and 103, too narrow a width W3 of the pits 109 makes reading of the identification information difficult. When $W3 \geq W1$ or $W3 \geq W2$ is satisfied, while the light beam scans the groove or land track 102 or 103, since approximately half or more of the light spot scans on the pits 109, the identification information of good quality can be obtained. If the width W3 of the pits 109 is too large, cross talk due to the adjacent identification information becomes significant, and reading of the identification information accordingly becomes difficult. According to an experiment, the identification information can be reliably read when $W3 \leq (W1+W2) \times 0.8$ is satisfied.

In order to detect the positional deviation of the light beam with regard to the center 110 of the track 104 using the first and second wobble pit 111 and 112, a signal amplitude of one wobble pit 111 or 112 needs to be reduced and that of the other wobble pit 111 or 112 needs to be increased when the light beam deviates away from the center 110 of the track 104. As the difference between signal amplitudes of the first and second wobble pits 111 and 112 with regard to an unit positional deviation is larger, more accurate signal can be obtained. If the width W4 of the first and second wobble pits 111 and 112 is slightly smaller than the width W1 of the groove track 102 or the width W2 of the land track 103, the difference between signal amplitudes of the first and second wobble pits 111 and 112 with regard to the unit positional deviation becomes larger. Specifically, a higher quality wobble tracking error signal can be obtained when $W4<W1$ or $w4<w2$ is satisfied. According to an experiment, good quality wobble tracking error detection signals are obtained when W4 is in a range of 0.5 to 0.8 of the width W1 or W2. The relationship between the width W4 of the first and second wobble pits 111 and 112 and the width W3 of the pits 109 is preferably set so $W4<W3$.

As described above, it is preferable that the widths of the track 104, the pits 109, the first and second wobble pits 111 and 112 are slightly different from each other rather than all of them having the same width. If the differences between the widths are not very large, an apparatus for generating a plurality of light beams is not necessary in the production steps. This is because the width W4 of the first and second wobble pits 111 and 112 becomes slightly narrower when the power of the light beam is decreased, or the width of a recording pulse is reduced when cutting is performed. The width W4 of the pits 109 becomes slightly wider if the power of the light beam is increased or the width of the recording pulse is increased. With the production steps considered for the steps described above, it is preferable that the width of each of the pits 109, 111, and 112 is equal to or larger than 70% or equal to or smaller than 120% of the width of the track 104. So, the optical recording medium 101 of the invention can cut the track 104, the identification information pits 109, and the first and second wobble pits 111 and 112 with a single light beam.

Figure 7:
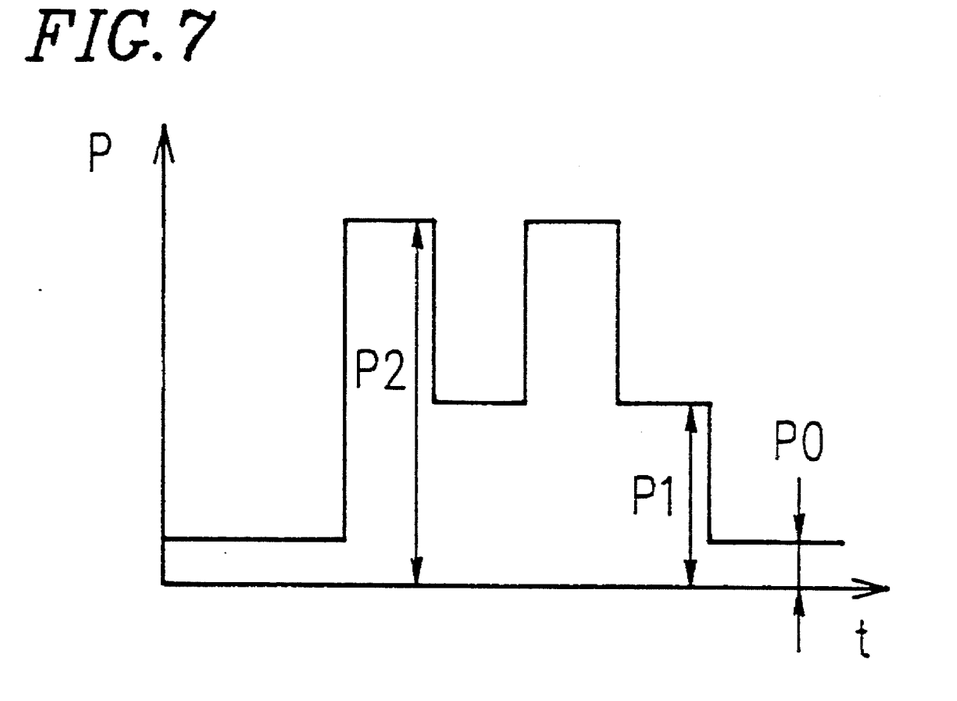
FIG. 7 is a chart used for explaining the power of the light beam when information is recorded on a phase change type medium.

Next, information recording will be described. When information is recorded, the intensity of a light beam produced by the light source 302 is modulated according to the information to be recorded. With reference to FIG. 7, the information recording will be described.

In FIG. 7, the vertical axis designates the power of light, and the horizontal axis designates time. FIG. 7 also shows a reproducing power P0 at which the information recorded on the optical recording medium 101 is read out, a crystal-power P1 for changing a phase change material into a crystal state, an amorphous-power P2 for changing the phase change material into an amorphous state. The portion illuminated with the amorphous-power P2 melts and becomes the amorphous state whether it was crystal or amorphous state prior to the illumination. On the other hand, the portion illuminated with the crystal-power V1 becomes the crystal state whether it was crystal or amorphous state previous to the illumination.

With reference to FIG. 2, the widths of the groove and land tracks will be described. Considering the quality of the reproduced signal, it is preferable that the powers of the light reflected from the groove and land tracks 102 and 103 are the same. In order to satisfy this preferable condition, the width W1 of the groove track 102 needs to be nearly equal to the width W2 of the land track 103.

Moreover, in order to provide an inexpensive recording apparatus, the configuration of a recording circuit needs to be simplified. It is necessary to consider the widths of the groove and land tracks 102 and 103 to equalize the recording conditions for recording information on the groove track 102 and on the land track 103. The thermal conductivity of the substrate 201 is smaller than that of the recording material film 203 or the reflection layer 205 by one figure, and the thermal conductivity of the reflection layer 205 is larger than that of the recording material film 203. Thus, heat caused by the light beam radiated on the groove track 102 or the land track 103 is released after being transmitted through the reflection layer 205, the recording material film 203, or the dielectric films 202 and 204.

As shown in FIG. 2, while the land track 103 is covered with the reflection layer 205, the groove track 102 covers the reflection layer 205. Thus, the land track 103 tends to release heat more quickly than the groove track 102 in the radial direction of the optical recording medium 101, the recording sensitivity thereby being reduced. In order to simplify the apparatus, it is preferable that the groove and land tracks 102 and 103 have the same recording sensitivity. To equalize their thermal releasing conditions, the width W2 of the land track 103 needs to be smaller than the width W1 of the groove track 102. Moreover, it is most preferable that a height d between the groove and land tracks 102 and 103 is approximately $\lambda/(8n)$, where $\lambda$ is a wave length of the light beam and n is a refractive index of the substrate 201.

Recording and reproducing apparatus has many implementations. For instance, one apparatus rotates the optical recording medium so as to maintain the peripheral velocity at a constant speed. In this case, the optical recording medium is rotated at a velocity of rotation inversely proportional to the radial position of the track being scanned. Another apparatus rotates the optical recording medium so as to maintain the angular velocity at a constant speed. When the optical recording medium As rotated so as to maintain the angular velocity constant, the dependency on the peripheral velocity needs to be considered. As described before, the phase change type material has the characteristic that it crystallizes when slowly cooled after having been heated, and it becomes amorphous when rapidly cooled after having been melted. The speed to be crystallized and the peripheral velocity are closely related to each other. Specifically, as the scanning velocity of the light beam toward the direction of the track with regard to the optical recording medium increases, the speed for crystallization also needs to be increased. For instance, in the case of a phase change type material having Te, Sb, and Ge as its main constituents, its crystallizing Speed becomes slower as the amount of Sb As increased. Therefore, in an optical recording medium used by rotating at a constant angular velocity, its peripheral velocity dependency can be reduced if the recording material is formed so that the more inner the optical recording medium is, the more Sb is contained.

Furthermore, by employing different track widths at the inner and outer track, the peripheral velocity dependency can be eased. For instance, the case of an optical recording medium of which the crystallizing speed is set to be at the optimum for its linear velocity and which records information using the amorphous state as a recording mark will be discussed.

When information is recorded at a slow linear velocity of the inner track, the recording mark tends to be affected by heat from before and behind the mark, and results in slowly cooling the optical recording medium, amorphous recording marks thereby becoming smaller. Therefore, in this case, recording marks having a predetermined size can be formed if the inner track have wider widths so as to improve heat releasing toward the radial direction of the optical medium. On the other hand, in an optical recording medium of which crystallizing speed is set to be at the optimum for the velocity of the inner track, recording information at faster linear velocities of outer track results in rapidly cooling the optical recording medium, and thereby, crystallization does not tend to happen. In this case, erasing errors can be reduced by providing narrower track widths at the outer track so as to prevent heat releasing toward the radial direction of the optical recording medium. So the peripheral velocity dependency can be eased by changing track widths according to the radial position of the optical recording medium.

EXAMPLE 2

Figure 8A:
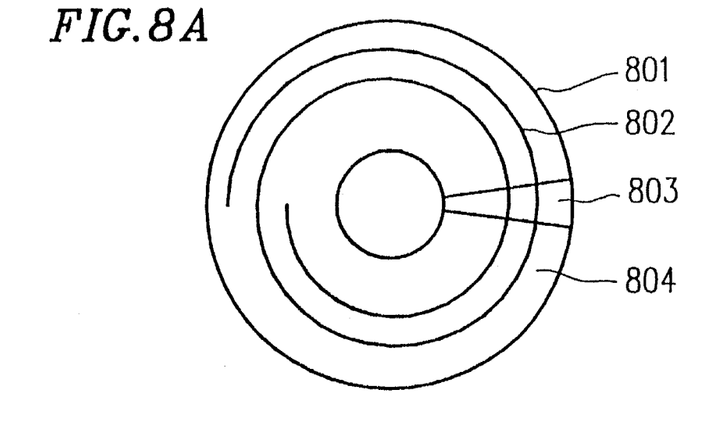
FIG. 8A is a schematic view of the surface of an optical recording medium in Example 2 of the invention.
Figure 8B:
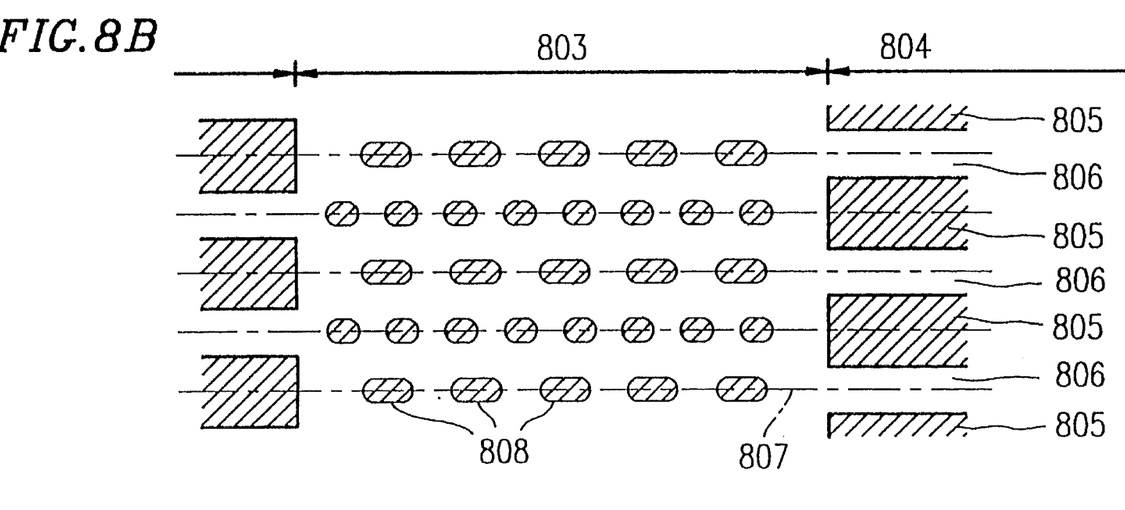
FIG. 8B is a partially enlarged view of the surface of the optical recording medium shown in FIG. 8A.

FIGS. 8A and 8B show schematic views of an optical recording medium. FIG. 8a is a plan view of an optical recording medium 801. The optical recording medium 801 has a spiral track 802. For the spiral track 802, groove end land tracks are alternately formed in every turn on the optical recording medium 801. The track 802 includes an alternation detection region 803 and an information region 804. The alternation detection region 803 is provided on a border region between the groove and land tracks. Identification information for identifying the groove or land tracks is stored in the alternation detection region 803. Information is already stored or will be stored in the information region 804.

FIG. 8B shows a partially enlarged view of the alternation detection region 803. The groove and land tracks 805 and 806 alternates at the alternation detection region 803. The center 807 of the track 802 is indicated by a dashed line. The alternation detection region 803 stores identification information as a form of pits 808 of concavities and convexities.

As shown in the figure, identification information pits 808 are provided at the top of each of the groove and land tracks 805 and 806, and the length and spacing in the direction of the track 808, namely a spatial frequency, is different between the groove and land tracks 805 and 806. Therefore, by scanning the alternation detection region 803, whether the next track which the light beam is scanning is the groove track 805 or the land track 806 can be easily identified.

Assuming a track width of a conventional optical recording medium as 0.8 µm and a track pitch as 1.6 µm, in order to reduce the track pitch down to ½ or 0.8 µm, the track width needs to be a very small value, such as 0.4 µm, for instance. It is difficult to cut or replicate such a narrow track. However, since the groove and land tracks 805 and 806 are provided alternately in the radial direction of the optical recording medium 801, if the width of the track 802 is set to 0.8 µm, the track pitch is also 0.8 µm. Thus, the master disk can be easily cut and replicated.

A comparison of the optical recording medium 101 of Example 1 and the optical recording medium 801 of Example 2 will be discussed. Since two spiral tracks 104 are formed on the optical recording medium 101 of Example 1, continuous recording or reproducing is difficult. For instance, after recording information on the groove track 102 from the inner track to the outer track on the optical recording medium 101, it is necessary to return to the inner track on the optical recording medium 101 to continuously record information on the land track 103 from the inner track to the outer track. Therefore, information cannot be recorded while the scanning Jumps from the outer track to the inner track. Moreover, even if information is recorded on the groove and land tracks 102 and 103 alternately for every turn on the optical recording medium 101, since the light beam needs to scan from the groove track 102 to the land track 103 by jumping a track for every rotation of the optical recording medium, information cannot be recorded during the jumping of a track. On the other hand, the optical recording medium 801 of Example 2 has the single spiral track 802, information can be recorded or reproduced continuously.

In Example 2, as with Example 1, if the thermal releasing conditions are different in the groove and land tracks 805 and 806, a recording condition, such as the recording power of the light beam for recording information and the width of the radiation pulse needs to be changed. If the widths of the groove and land tracks 805 and 806 are different, the powers of the reflected light beams therefrom are different, and thus, their reproducing amplitudes are also different. Moreover, when the tracking control is performed by detecting a tracking error signal by the push-pull method, the polarities of the tracking error signals are opposite for the groove and land tracks 805 and 806. Since the optical recording medium 801 of the invention stores the identification information for identifying the type of a track in the alternation detection region 803, recording and reproducing condition or the polarity of the tracking control can be switched easily depending on the groove track 805 or the land track 806.

Figure 9:
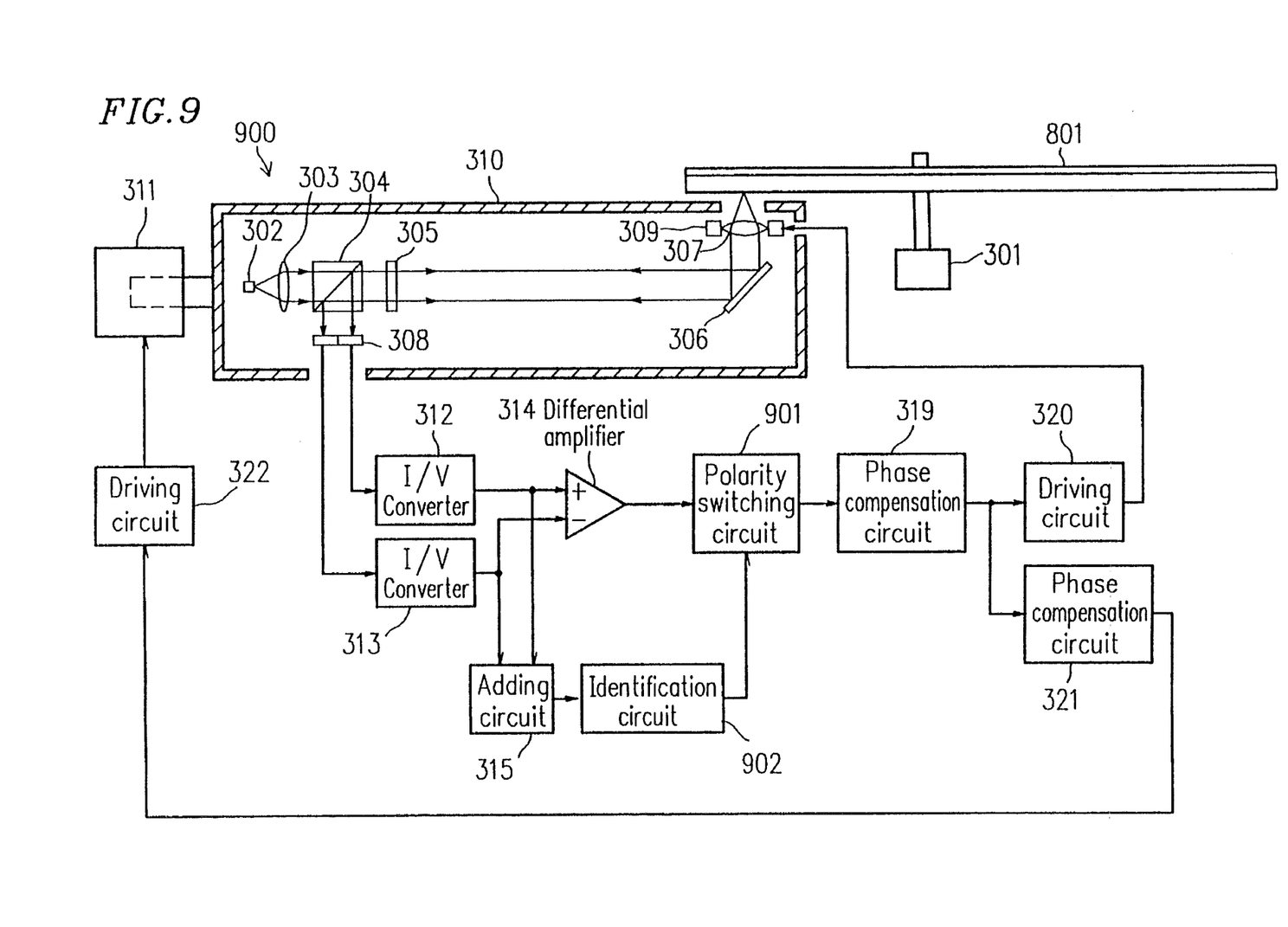
FIG. 9 is a block diagram of an apparatus suitable for the optical recording medium of Example 2 of the invention.

With reference to FIG. 9, a recording and reproducing apparatus to which the phase change type optical recording medium 801 is applied will be briefly described. The elements having the same functions as those shown in FIG. 3 are labeled with the same reference numerals, and their description will be omitted.

In a recording and reproducing apparatus 900 shown in FIG. 9, an output signal of the differential amplifier 314, namely a %racking error signal, is applied to the tracking coil of the actuator 309 through a polarity switching circuit 901, the phase compensation circuit 319, and the driving circuit 320. The tracking error signal is also applied to the linear motor 311 through the polarity switching circuit 901, the phase compensation circuits 319 and 321, and the driving circuit 322. An identification circuit 902 identifies from an output signal of the adding circuit 318 whether the track 802, on which the light beam will be positioned next, is the groove track 805 or the land track 806, and sends the identification signal to the polarity switching circuit 901. The polarity switching circuit 901 switches the polarity of an output signal thereof responding to an output signal of the identification circuit 902. For example, when a low level signal indicating the groove track 805 is sent from the identification circuit 902, the polarity switching circuit 901 outputs a signal having the same phase as that of the output of the differential amplifier 314. When a high level signal indicating the land track 806 is sent from the identification circuit 902, the polarity switching circuit 901 outputs a signal having an inverted phase from that of the output of the differential amplifier 314. Thus, since the polarity of the tracking control reverses at every rotation of the optical recording medium 801, the light beam continuously tracks the single spiral track consisting of the groove and land Cracks 805 and 806 alternately for every turn.

In Example 2, though the identification information stored in the alternation detection region 803 is stored as concave and convex pit signals having different spatial frequencies on the groove and land tracks 805 and 806, the form of the identification information is not limited to this example. For instance, the identification information may be a track address. In such a case, if serial track numbers are stored from the inner to the outer track of the optical recording medium 801, the groove and land tracks 805 and 806 can be identified depending on whether a track number is even or odd.

EXAMPLE 3

In Example 2, though a single spiral track is formed by alternately forming the groove and land Cracks 805 and 806 for every turn of the optical recording medium 801, there are also other track configurations. In Example 3, an optical recording medium is radially divided into an odd number and the groove and land tracks alternates a plurality of times for every turn so as to form a single spiral track. In this case, the optical recording medium needs to be divided into (2n+1), sectors where n is a positive integer, so that the groove and land tracks are arranged alternately in the radial direction, of the optical recording medium. Thus the single spiral track is divided into an odd number of at least three sectors.

When a tracking error signal is detected by the push-pull method to perform the tracking control, by inverting the polarity of the tracking error signal at the boundary between the groove end land tracks, it is possible to position the light beam on the single spiral track and have the light beam continuously track the single spiral track.

Figure 10A:
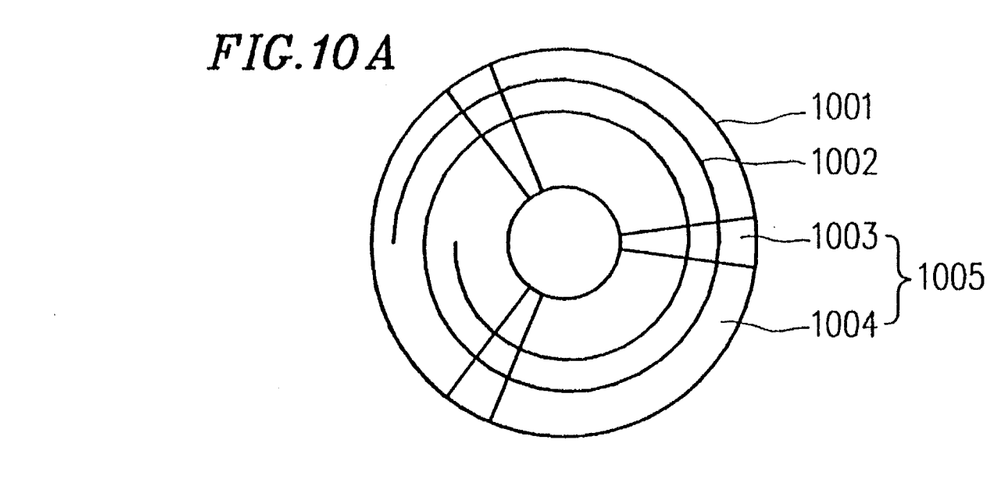
FIG. 10a is a schematic view of the surface of an optical recording medium in Example 3 of the invention.
Figure 10B:
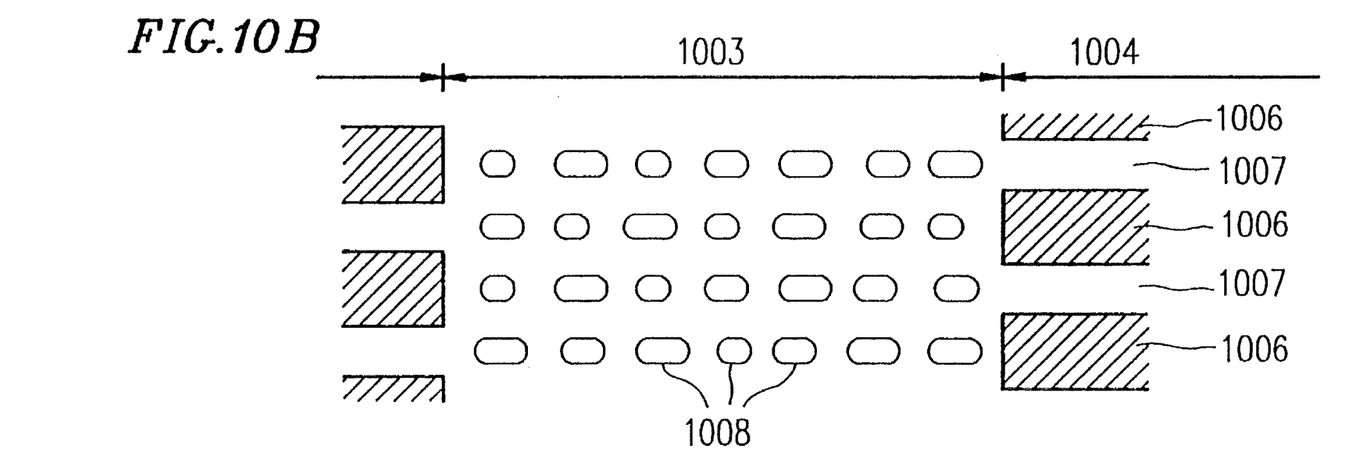
FIG. 10B is a partial enlarged view of the optical recording medium shown in FIG. 10A.

An example of the optical recording medium of Example 3 is shown in FIGS. 10A and 10B. These figures show an instance in which an optical recording medium 1001 is divided into three portions.

FIG. 10A shows a plan view of the optical recording medium 1001. As shown in the figure, a spiral groove or land track 1002 is provided on the optical recording medium 1001. One turn of the spiral track is divided into sectors of an odd number, for instance there are three sectors 1005 shown in FIG. 10A. A sector 1005 consists of a pair of an ID region 1003 end an information region 1004. The ID region 1003 stores an identification information for identifying the position of an information region as a form of concave end convex pits. Information is already stored or will be stored in the information region 1004.

FIG. 10B shows a partially enlarged view of the ZD region 1003. The information regions 1004 corresponding to each groove and land tracks 1006 and 1007, and the ID regions 1003 consisting of pits 1008 representing the identification information are formed. The ID region 1003 stores a track number and a sector number as the identification information, and the next track 1002 to be scanned by a light beam is identified whether it is a groove track 1006 or the land track 1007 depending on whether the track and sector numbers are even or odd numbers.

In Example 3, though the ID region 1003 stores track and sector numbers, the invention is not limited to this example. For example, serial sector numbers may be stored in the ID regions 1003 from the inner to the outer track of the optical recording medium 1001. For instance, sector numbers 0 to 2 are stored in the innermost first turn of the track 1002, sector numbers 3 to 5 are stored in the second turn of the track 1002, and serial sector numbers are stored in this manner for the rest of the turns. If the serial sector numbers are stored in this manner, the next track 1002 to be scanned by the light beam can be identified whether it is the groove track 1002 or the land track 1006 depending on whether the sector number is an odd or even number.

In Example 3, as with Example 2, the groove and land tracks 1006 and 1007 can be alternately formed for every turn on the optical recording medium 1001 to form the single spiral track 1002. In this case, the number of the sectors in a turn may be an even number. For example, the groove and land track 1006 and 1007 may alternate at the sector 0.

However, the invention is not limited by these examples. For instance, though the optical recording medium 101 in FIG. 1 has four sectors in a turn, the number of sectors is not limited to only four. As the number of sectors in a turn increases, the correction by the wobble tracking error signal can be performed more accurately.

Moreover, though the optical recording medium 101 in Example 1 consists of two spiral tracks 104, which are the continuous groove and land tracks 102 and 103, a single spiral track can be formed by alternately providing groove and land tracks as shown in Example 3. In this case, since the polarities of the tracking are opposite in the groove and land tracks, the polarity of the tracking control is reversed for every rotation of the optical recording medium, for example, every time the sector 0 is detected. In Example 1, the number of the sectors in a turn may be an odd number and the groove and land tracks may be provided alternately for every sector.

Furthermore, the invention can be applied to an optical recording medium which is radially divided into a plurality of zones and the number of the sectors in a turn changes from the inner zones to the outer zones. Regarding optical recording materials, magneto-optical materials may be also used, and any material on which information can be recorded by a light beam can be used.

Various other modifications will be apparent to end can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical recording medium in a disk shape comprising:
    a substrate having a groove track and a land track, Information being recorded on both the groove track and the land track;
    a recording thin film formed on the substrate; and
    identification information pits for identifying a recording region of each of the groove track and the land track, the identification information pits being commonly used for the groove track and the land track adjacent to each other.

2. An optical recording medium according to claim 1, wherein a width of the identification information pits is substantially equal to a width of, at least, one track of the groove track and land track.

3. An optical recording medium according to claim 1, wherein a width of the identification information pits is larger than or to a width of, at least, one of the groove track and the land track, and equal to or smaller than a value which is 80% of a sum of the width of the groove track and the width of the land track.

4. An optical recording medium according to claim 1, further comprising two wobble pits provided on both sides of a center line of each of the groove track and the land track, and being spaced in a direction of the tracks.

5. An optical recording medium according to claim 4, wherein a width of the identification information pits is substantially equal to a width of, at least, one of the groove track and the land track.

6. An optical recording medium according to claim 4, wherein a width of the identification information pits is larger than or equal to a width of, at least, one of the groove track and the land track, and equal to or smaller than a value which is 80% of a sum of the width of the groove track and the width of the land track.

7. An optical recording medium according to claim 4, wherein a width of the wobble pits is smaller than a width of, at least, one of the groove track and the land track.

8. An optical recording medium according to claim 4, wherein the two wobble pits are provided after the identification information pits.

9. An optical recording medium in a disk shape comprising;
    a substrate having groove and land tracks, information being recording on both of the groove and land tracks, and a width of the land track being smaller than a width of the groove track; and
    a recording thin film provided on the substrata, information being recorded by heat provided by a light beam in the recording thin film.

10. An optical recording medium in a disk shape comprising:
    a substrate having groove-and land tracks, information being recording on both the groove and land tracks, and a widths of the groove track and the land track of outer turns being smaller than widths of the groove track and the land track of inner turn, respectively; and
    a recording thin film provided on the substrate, information being recorded by heat provided by a light beam in the recording thin film.

11. An optical recording medium comprising:
    a substrate in a disk shape which has a single spiral track formed by alternately providing a groove track and a land track;
    a recording thin film for recording information formed on the substrate; and
    an identification region in which an identification information for identifying whether a portion of the single spiral track is the groove track or the land track is stored, the identification information being positioned at a beginning of each of the groove track and land track.

12. An optical recording medium according to claim 11, wherein spatial frequencies are different between the identification information in the groove track and the identification information in the land track.

13. An optical recording medium according to claim 11, wherein the identification information is an address for identifying a recording position of information.

14. An optical recording medium comprising:
    a substrate in a disk shape which has a single spiral track formed by alternately providing a groove track and a land track;
    a recording thin film for recording information formed on the substrate; and
    a track address for identifying a recording region in which information is recorded, the track address being positioned at a beginning of each of the groove track and land track.

15. An optical recording medium comprising:
    a substrate in a disk shape which has a single spiral track divided into an odd number of at least three sectors in a turn, and which has groove track and land track provided alternately; and
    a recording thin film for recording information formed on the substrate.

16. An optical recording medium according to claim 15, wherein an identification information for identifying whether a portion of the single spiral track in each sector is the groove track or the land track is recorded at a beginning of the sector.

17. An optical recording medium according to claim 16, wherein the identification information is an address for identifying a position of the sector.

* * * * *

UNITED STATES PATENT AND TRADEMARK OFFICE
CERTIFICATE OF CORRECTION

PATENT NO. : 5,508,995
DATED : April 16, 1996
INVENTOR(S) : Moriya et al.

It is certified that error appears in the above-indentified patent and that said Letters Patent is hereby corrected as shown below:

Column 4, line 63, change "ID region 10B" to --ID region 105--.

Column 7, line 48, change "circuit 315" to --circuit 316--.

Column 10, line 34, change "the crytal-power V1" to --the crystal-power P1--.

Column 13, line 22, change "the adding circuit 318" to the adding circuit 315--.

Column 13, line 63, change "(2n+1), sectors" to --(2n+1) sectors,--.

Column 14, line 22, change "view of the ZD region 1003" to --view of the ID region 1003--.

Column 15, line 20, delete "Information" and insert --information--.

UNITED STATES PATENT AND TRADEMARK OFFICE
CERTIFICATE OF CORRECTION

PATENT NO. : 5,508,995
DATED : April 16, 1996
INVENTOR(S) : Moriya et al.

It is certified that error appears in the above-indentified patent and that said Letters Patent is hereby corrected as shown below:

Column 15, line 35, between "or" and "to" insert --equal--.

Column 16, line 1, delete "substrata" and insert --substrate--.

Column 16, line 6, delete the hyphen "-" between "groove" and "and".

Signed and Sealed this

Third Day of September, 1996

Attest:

BRUCE LEHMAN

Attesting Officer

Commissioner of Patents and Trademarks